United States Patent Office 3,729,468
Patented Apr. 24, 1973

3,729,468
TRIAZINE DERIVATIVES AND PROCESS FOR
THEIR PREPARATION
Hideo Tani, Masahiko Nagakura, and Takashi Mizutani,
Tokyo, Japan, assignors to Kowa Company, Ltd.,
Nagoya, Japan
No Drawing. Filed July 17, 1968, Ser. No. 745,393
Claims priority, application Japan, July 20, 1967,
42/46,318; Sept. 13, 1967, 42/58,325; Apr. 1, 1968,
43/20,965
Int. Cl. C07d 87/40, 87/46
U.S. Cl. 260—246 B
40 Claims

ABSTRACT OF THE DISCLOSURE

Novel triazine derivatives having a hypotensive activity and diuretic activity, and are useful in the field of medicines, expressed by the following formula:

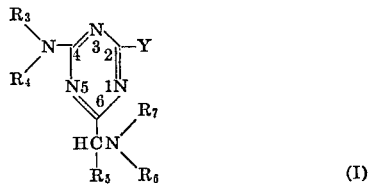
(I)

wherein Y represents a member selected from the group consisting of lower alkoxy, azido and

$R_1$, $R_2$, $R_3$, $R_4$, $R_6$ and $R_7$ may be the same or different and represent a member which may have substituents and is selected from the group consisting of a hydrogen atom, amino group, lower alkyl group, allyl group, cycloalkyl group and aryl group; each of $R_1$ and $R_2$, $R_3$ and $R_4$, and $R_6$ and $R_7$ may bond together to form a multi-membered ring which may have substituents and is selected from the group consisting of multi-membered ring bonded with methylene, multi-membered ring bonded with methylene through an oxygen atom, multi-membered ring bonded with methylene through a nitrogen atom and bicyclo multi-membered ring; and $R_5$ represents a member selected from the group consisting of an aryl group and pyridyl group which may have substituents and their salts, and also to a process for their preparation.

This invention relates to novel triazine derivatives and their salts, and to a process for their preparation. More particularly, it relates to triazine derivatives expressed by the following formula:

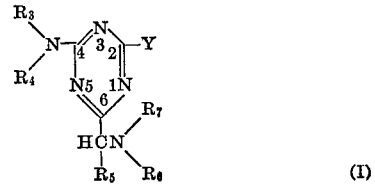
(I)

wherein Y represents a member selected from the group consisting of lower alkoxy, azido and

$R_1$, $R_2$, $R_3$, $R_4$, $R_6$ and $R_7$ may be the same or different and represent a member which may have substituents and is selected from the group consisting of a hydrogen atom, amino group, lower alkyl group, allyl group, cycloalkyl group and aryl group; each of $R_1$ and $R_2$, $R_3$ and $R_4$, and $R_6$ and $R_7$ may bond together to form a multi-membered ring which may have substituents and is selected from the group consisting of multi-membered ring bonded with methylene, multi-membered ring bonded with methylene through an oxygen atom, multi-membered ring bonded with methylene through a nitrogen atom and bicyclo multi-membered ring; and $R_5$ represents a member selected from the group consisting of an aryl group and pyridyl group which may have substituents and their salts, and also to a process for their preparation.

The compounds expressed by the above Formula I are novel substances not hitherto reported in literature. They have a hypotensive activity and diuretic activity, and are useful in the field of medicines. The compounds of Formula II, as explained hereunder, are also novel substances, but analogous compounds, especially those wherein Y is an amino group,

is an amino group and X is a hydrogen atom, are known compounds.

Among the compounds expressed by the Formulae II and III, as also explained hereunder, preferable are those in which Y is a member which may have substituents and is selected from the group consisting of a lower alkoxy group having 1–3 carbon atoms, azido group and

with the proviso that $R_1$ and $R_2$ may be the same or different and represent a member selected from the group consisting of a hydrogen atom, lower alkyl group having 1–6 carbon atoms and —$NH_2$, or $R_1$ and $R_2$ may bond together to form a multi-membered ring bonded with methylene, preferably 5- to 8-membered ring; $R_3$ and $R_4$ may be the same or different and represent a member which may have substituents and is selected from the group consisting of a hydrogen atom, a lower alkyl group having 1–6 carbon atoms, allyl group, cycloalkyl group having 5–7 carbon atoms, preferably cyclohexyl, and aryl group, preferably phenyl, or $R_3$ and $R_4$ also may represent a member which may combine together to form a multi-membered ring which may have substituents and is selected from the group consisting of a multi-membered ring bonded with methylene, preferably 5- to 8-membered ring and a multi-membered ring, preferably 6-membered ring, bonded with methylene through an oxygen atom; $R_6$ and $R_7$ together represent a member which may have substituents and is selected from the group consisting of a multi-membered ring bonded with methylene, preferably 5- to 8-membered ring, multi-membered ring, preferably 6-membered ring, bonded with methylene through an oxygen atom, multi-membered ring, preferably 6-membered ring, bonded with methylene through a nitrogen atom and azabicyclo nonane; and $R_5$ is a phenyl or pyridyl group which may have substituents.

The compounds of Formula I of the invention are obtained only by contacting the compounds of Formula II with the compounds of Formula III in an inert organic solvent in the presence or absence of a base. The reaction can be effected at room temperature or lower temperature, but generally it is preferable to effect the reaction at 25–150° C.

Usable as the solvent are, for instance, lower alcohols such as methanol, ethanol, n-propanol, iso-propanol, n-butanol, secondary butanol and tertiary butanol; hydrocarbons such as benzene, toluene, xylenes, cyclohexane, petroleum ether and petroleum benzine; ethers such as ether, methyl ethyl ether, dioxane and tetrahydrofurane; ketones such as acetone, methyl ethyl ketone and diethyl ketone; and methyl Cellosolve. Ethanol and methyl Cellosolve are especially preferable solvents.

If desired, the reaction can be carried out in the presence of a base, the examples of which are inorganic bases, for instance, alkali carbonates such as sodium carbonate, calcium carbonate and potassium carbonate and alkali hydroxides such as sodium hydroxide, potassium hydroxide and calcium hydroxide, and organic bases, for instance, metal alcoholates such as sodium methylate, sodium ethylate, potassium methylate and potassium ethylate, alkali amides such as sodium amide and potassium amide, teritary amines such as triethylamine, dimethyl-aniline and pyridine, and quaternary ammonium salts such as trimethylbenzyl ammonium salt. The inorganic bases, metal alcoholates and tertiary amines are particularly advantageously used. It is also advantageous to use an excessive amount of the amines of Formula III which are the starting materials of the invention.

There is no restriction on the reaction time. Usually, the reaction time is 5 to 70 hours at room temperature, and about 30 minutes to 15 hours at the boiling point of the solvent used, namely, under reflux.

The molar ratio of the compounds of Formula II to Formula III is 1:1 in principle, but may be in the range of 1:0.5 to 1:5. As mentioned above, it is preferable to use an excessive amount, usually 1.1 moles to 3 moles, of the amine.

The amount of the solvent is either not particularly restricted, and may sufficiently be one which provides a solution of the reaction system. Usually, however, it is 3 to 40 times, preferably 5 to 25 times, the weight of the compound of Formula II. When a base is used in the reaction, the amount used is 0.5–3 moles, preferably 1–1.5 moles, per mole of the compound of Formula II, although varying according to the type of the base, reaction temperature and time, and other factors.

The 1,3,5-triazine derivatives obtained by the invention are basic compounds, and may be converted into the corresponding salts by reaction with inorganic or organic acids. The conversion can be easily carried out by dissolving the compounds of Formula I in a suitable solvent, for instance, an alcohol such as methanol or ethanol, a hydrocarbon such as benzene or toluene, a ketone such as acetone or methyl ethyl ketone, or ethyl acetate, adding a calculated amount or slightly excessive amount of inorganic or organic acids to the solutions, and then removing the solvent by distillation. It is preferable, if desired, to purify the salts by recrystallization from a suitable solvent, for instance, an alcohol such as methanol or ethanol, a ketone such as acetone or methyl ethyl ketone, an ether such as diethyl ether or dioxane, a hydrocarbon such as benzene or toluene, or dimethylformamide, or a mixture of these.

As such acids, there can be cited inorganic acids such as hydrochloric acid, hydrobromic acid, sulfuric acid, nitric acid, phosphoric acid and hydroiodic acid, and organic acids, for instance, aliphatic monocarboxylic acids such as acetic acid and propionic acid, aliphatic dicarboxylic acids such as malonic acid, succinic acid, maleic acid and fumaric acid, hydroxy such as glycolic acid, malic acid, tartaric acid and citric acid, aromatic carboxylic acids such as benzoic acid, mandelic acid, salicylic acid and phthalic acid, sulfonic acids such as methanesulfonic acid and benzenesulfonic acid, and nicotinic acid.

In the compounds of the Formulas II and III, the preferred lower alkoxy groups as mentioned are methoxy, ethoxy and n-propoxy groups. As lower alkyl groups, we can cite, for instance, a methyl group, ethyl group, n-propyl group, n-butyl group, n-pentyl group and n-hexyl group. Chain isomers of these alkyl groups may also be employed. As the cycloalkyl group, there can be mentioned a cyclopropyl group, cyclobutyl group, cyclopentyl group, cyclohexyl group, cycloheptyl group and cyclooctyl group. These aliphatic residues may have substituents at their hydrocarbon chain.

Examples of the multi-membered rings formed by either of the combinations of $R_1$ and $R_2$, $R_3$ and $R_4$, or $R_6$ and $R_7$ are as follows:

Multi-membered rings bonded with methylene such as

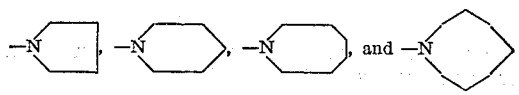

Multi-membered rings bonded with methylene through an oxygen atom, such as

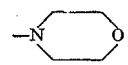

Multi-membered rings bonded with methylene through a nitrogen atom, such as

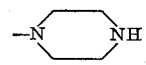

Bicyclo multi-membered rings, such as

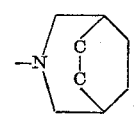

They may also have substituents, for instance, a lower alkyl group such as a methyl group and ethyl group, phenyl group which may have substituents,

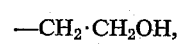

lower alkoxy group, and halogen atom.

$R_5$ is preferably a phenyl or pyridyl group which may have substituents such as a sulfamoyl group, halogen atom, lower alkyl group, lower alkoxy group, hydroxyl group, substituted amino group and alkoxy carbonyl group.

The compounds of Formula II can be prepared by reacting compounds of the following Formula V

(V)

wherein $R_9$ is a group selected from the group consisting of a carboxyl group, alkoxycarbonyl group, halogenocarbonyl group, acid anhydride residue, and cyano group; $R_5$ has the same meaning as in Formula I; and Q represents a member selected from the group selected from a hydrogen atom and halogen atom,
with compounds of the following Formula IV

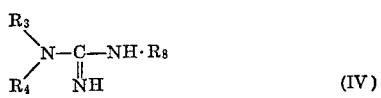
(IV)

wherein $R_8$ represents a group selected from the group consisting of an amidine residue, cyano group and carbamoyl group, and $R_3$ and $R_4$ have the same meanings as mentioned in Formula I,
or their acid salts, preferably inorganic acid salts, in the presence of an inert organic solvent. The reaction proceeds if the compounds of the Formulae V and IV are contacted with each other in said solvent. The reaction may be carried out in the presence or absence of a base such as those cited above with respect to the reaction of compounds of Formulae II and III. Preferable bases are alkali metal alcoholates and alkali metal hydroxides. The same solvents as mentioned above can also be employed. These solvents may contain water.

No particular restriction is made in respect of the reaction time and temperature. The usable temperature is room temperature to 200° C., and a sufficient reaction time is 2 to 100 hours.

If Q in Formula V is a hydrogen atom, the following compound results

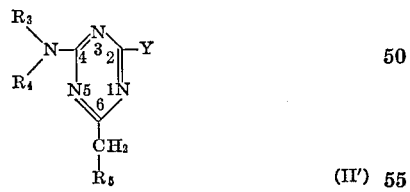
(II')

wherein Y, $R_3$, $R_4$, and $R_5$ have the same meaning as in Formula I.
In this case, halogenation of it will give the compound expressed by Formula II. The halogenation can be easily effected by treating the compound of Formula II' with a halogenating agent such as chlorine, bromine, N-halogen imide, for instance, N-bromosuccinimide, and N-chloroacetamide in the presence of an inert organic solvent. Examples of the solvent used in the halogenation are carbon disulfide, an alcohol such as methanol and ethanol, halogenated hydrocarbons such as chloroform, carbon tetrachloride and dichloroethane, and lower aliphatic acids such as acetic acid and water-containing acetic acid. The reaction temperature is not particularly restricted, but varies according to the solvent used. For example, a temperature in the range of —5 to +150° C. may be employed. The final product can be separated in a usual manner.

A compound of Formula II' wherein Y is —$NH_2$ is prepared from the compound of Formula V wherein Q is a hydrogen atom and the compound of Formula IV wherein $R_8$ is

(i.e. an amidine residue). Hydrolysis of this compound with an acid or alkali gives a compound of Formula II' wherein Y is —OH, which can be converted into a compound of Formula II' wherein Y is a halogen atom by reacting it with a phosphorus halide or phosphorus oxyhalide. When this compound is reacted with any of the compounds expressed by the general formula

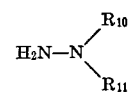

$MN_3$, $MOR_{12}$ and $MSR_{12}$, wherein $R_{10}$ and $R_{11}$ have the same meanings as $R_1$ and $R_2$; $R_{12}$ represents an aliphatic or aromatic residue which may have a substituent, such as a methyl group, ethyl group, propyl group, butyl group, phenyl group and benzyl group; and M is an alkali metal or alkaline earth metal, a compound of the Formula II' wherein Y is either

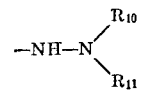

—$N_3$, —$OR_{12}$ or —S—$R_{12}$ is prepared. Furthermore, reaction of the compound of Formula II' wherein Y is —$SR_{12}$ with a compound of the formula

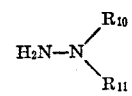

or $MN_3$, wherein $R_{10}$, $R_{11}$ and M have the same meanings as defined above, gives a compound of the Formula II' wherein Y is

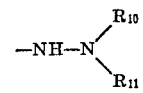

or —$N_3$

The compounds of Formula II' wherein Y is as defined in connection with Formula II can be converted by halogenation into the compounds of Formula II.

The amines of Formula III are known compounds, and may be produced by any known methods. The compound of Formula V wherein Q is a hydrogen atom is also a known compound, and can be prepared by any known procedure. The compound of Formula V wherein Q is a halogen atom can be easily prepared by halogenating the compound of Formula V wherein Q is a hydrogen atom under the same conditions and with the same solvent and halogenating agent as described with the halogenation above. The compounds of Formula IV can also be prepared by a known method (for instance, J. Am. Chem. Soc. 81, 3725, 1959) or a similar procedure.

The process of the invention which has been described above in detail will be schematically shown below including the process for preparation of the starting compound of the Formula II.

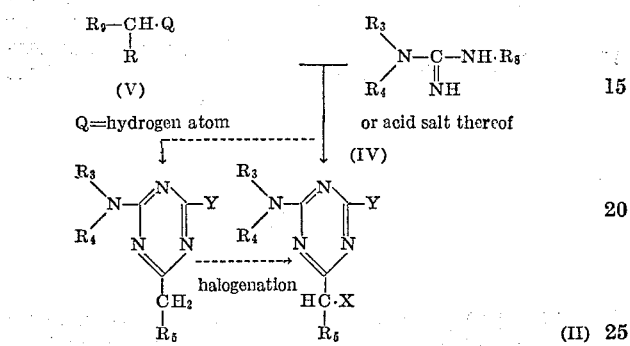

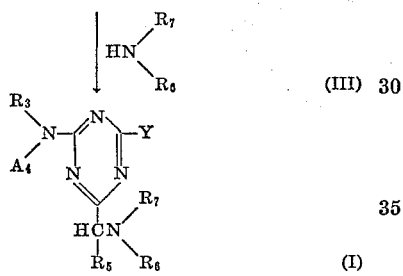

The compound of Formula I of the invention which results from the reaction of the compounds of Formula II and III can be refined by a procedure which comprises removing the solvent by distillation, adding water, and then alkali such as alkali metal carbonate, to it, extracting the compound of Formula I from the mixture with the use of a water-immiscible solvent such as chloroform, methylene chloride or ethyl acetate, drying it in a usual manner, removing the solvent, or recrystallizing it from a suitable solvent, for instance, lower alcohols such as methanol and ethanol, a mixture of water and alcohol, ketones such as acetone or methyl ethyl ketone, ethyl acetate; and halogenated hydrocarbons such as chloroform or methylene chloride. If desired, the product can be refined by subjecting it to liquid chromatgraphy with the use of an alumina or silica gel column, and recrystallizing the eluate.

Table I shows the hypotensive activity of several typical compounds produced by the process of the invention together with acute toxicity (LD$_{50}$) data.

These compounds are as follows. (The reference numerals correspond to those in Tables I, II, III and IV):

(1) 2-amino-4-morpholino-6-(2'-pyridyl-morpholinomethyl)-1,3,5-triazine
(2) 2,4-diamino-6-(2'-pyridyl-morpholinomethyl)-1,3,5-triazine
(3) 2-amino-4-methylamino-6-(2'-pyridyl-morpholinomethyl)-1,3,5-triazine
(4) 2-amino-4-dimethylamino-6-(2'-pyridyl-morpholinomethyl)-1,3,5-triazine
(5) 2-amino-4-diallylamino-6-(2'-pyridyl-morpholinomethyl)-1,3,5-triazine
(6) 2-amino-4-N-methylanilino-6-(2'-pyridyl-morpholinomethyl)-1,3,5-triazine
(7) 2-amino-4-piperidino-6-(2'-pyridyl-morpholinomethyl)-1,3,5-triazine
(8) 2-amino-4-morpholino-6-(2'-pyridyl-piperidinomethyl)-1,3,5-triazine
(9) 2-amino-4-morpholino-6-(2'-pyridyl-N-azacycloheptylmethyl)-1,3,5-triazine
(14) 2-amino-4-dimethylamino-6-(phenyl-morpholinomethyl)-1,3,5-triazine
(21) 2-amino-4-ethylamino-6-(2'-pyridyl-morpholinomethyl)-1,3,5-triazine
(22) 2-amino-4-diethylamino-6-(2'-pyridyl-morpholinomethyl)-1,3,5-triazine
(23) 2-amino-4-allylamino-6-(2'-pyridyl-morpholinomethyl)-1,3,5-triazine
(25) 2-amino-4-benzylamino-6-(2'-pyridyl-morpholinomethyl)-1,3,5-triazine
(26) 2-amino-4-pyrrolidino-6-(2'-pyridyl-morpholinomethyl)-1,3,5-triazine
(35) 2,4-di-monomethylamino-6-(2'-pyridyl-morpholinomethyl)-1,3,5-triazine
(43) 2-amino-4-morpholino-6-(3'-pyridyl-morpholinomethyl)-1,3,5-triazine.

TABLE I

| Example No. | Acute toxicity (LD$_{50}$) up-and-down method (mice) (mg./kg.) | | Dose (i.v.) (mg./kg.) | Lowering activity of blood pressure, urethan anaesthetized rats (body weight: 200-250 g. each) | |
|---|---|---|---|---|---|
| | I.v. | I.p. | | Mm. Hg. | Hours |
| 1 | 684 | 784 | 40 | 45 | >6 |
| | | | 2.5 | 10 | |
| 2 | 500-750 | >1,000 | 60 | 55 | >5 |
| | | | 20 | 50 | >5 |
| 3 | 537 | | 50 | 60 | >6 |
| 4 | 250-500 | | 35 | 50 | >5 |
| 5 | 125-250 | | 20 | 20 | (¹) |
| 6 | 125-250 | 250-750 | 20 | 20 | 1.5 |
| 7 | 125-250 | | 20 | 25 | 2.5 |
| 8 | 125-250 | 500-750 | 20 | 25 | (²) |
| 9 | 62.5-125 | 250-500 | 10 | 12 | 2 |
| 14 | 125-250 | | 20 | 10 | (¹) |
| 21 | 125-500 | >1,000 | 20 | 40 | >5 |
| 22 | 125-250 | 125-250 | 20 | 55 | >5 |
| 23 | 250-500 | 500-1,000 | 35 | 35 | >5 |
| 25 | 125-250 | 250-500 | 20 | 5 | (³) |
| 26 | 250-750 | 500-1,000 | 50 | 55 | 3 |
| 35 | 500 | | 10 | 60 | >3 |
| 43 | 750-1,000 | | 100 | 100 | (⁴) |

¹ 30 minutes.   ² 50 minutes.   ³ Transient.   ⁴ 2 minutes.

Several embodiments of the process of the invention will be given below.

EXAMPLE 1

Preparation of compound of Formula II (1) N',N' - anhydro - bis($\beta$ - hydroxyethyl)-biguanide hydrochloride (3.6 g.) was suspended in 15 ml. of anhydrous methanol. A sodium methylate solution prepared from 0.58 g. of sodium and 5.5 ml. of methanol was added to the suspension. After adding 5.3 g. of ethyl 2-pyridyl-bromoacetate (one example of the compound of Formula V wherein Q is a halogen atom) the resulting mixture was left to stand for 72 hours at room temperature. Subsequent addition water gave the precipitate of crystals, which were collected by filtration and recrystallized from ethanol. There was obtained 1.3 g. (21% yield) of 2-amino - 4 - morpholino-6-(2'-pyridyl-bromomethyl)-1,3,5-triazine having a melting point of 155–156° C. (decomp.):

Analytical values as $C_{13}H_{15}N_6OBr$ are as follows:
Calculated (percent): C, 44.45; H, 4.31; N, 23.93; Br, 22.75. Found (percent): C, 44.66; H, 4.44; N, 23.76; Br, 22.96.

(2) The compound of the Formula II can be prepared also by the following procedure with the use of the compound of Formula V wherein Q is a hydrogen atom.

N',N'-anhydro-bis-(β-hydroxyethyl)-biguanide hydrochloride (1.05 g.) was added to a sodium methylate solution prepared from 0.172 g. of sodium and 7 ml. of anhydrous methanol, and on addition of 1.0 g. of ethyl-2-pyridyl acetate, the mixture was reacted for 20 hours at room temperature. Subsequent addition of water gave the precipitate of crystals, which were collected by filtration and recrystallized from methanol. There was obtained 0.78 g. (48% yield) of 2-amino-4-morpholino-6-(2'-pyridylmethyl)-1,3,5-triazine having a melting point of 148–149° C.

The analytical values as $C_{13}H_{16}N_6O$ are as follows:
Calculated (percent): C, 57.34; H, 5.92; N, 30.86.
Found (percent): C, 57.48; H, 6.08; N, 30.56.

The above obtained 2-amino-4-morpholino-6-(2'-pyridylmethyl)-1,3,5-triazine (1.36 g.) was dissolved into 20 ml. of chloroform. While cooling the solution with ice to a temperature below 0° C., a solution of 0.8 g. of bromine in 3 ml. of chloroform was added dropwise. The mixture was stirred for 30 minutes at the same temperature, and the chloroform was removed by distillation. The residue was dissolved into water, and made alkaline with sodium carbonate. The precipitated crystals were recrystallized from ethanol to obtain 1.16 g. (68% yield) of 2-amino-4-morpholino-6-(2'-pyridyl-bromomethyl)-1,3,5-triazine having a melting point of 155–156° C. (decomposition).

Analytical values as $C_{13}H_{15}N_6OBr$ are as follows:
Calculated (percent): C, 44.45; H, 4.31; N, 23.93.
Found (percent): C, 44.79; H, 4.46; N, 24.23.

Preparation of the compound of Formula I

The 2-amino-4-morpholino-6-(2'-pyridyl-bromomethyl)-1,3,5-triazine obtained in (1) or (2) above (5.0 g.) and 2.5 g. of morpholine were added to 50 ml. of ethanol. The mixture was heated under reflux for 5 hours, and ethanol was removed by distillation. Water was added to the residue, and the mixture was made alkaline with sodium carbonate, followed by extraction with chloroform. The extract was dried over sodium sulfate, and chlorform was removed by distillation. The residue was recrystallized from ethanol to give 2.7 g. (53% yield) of 2-amino-4-morpholino-6-(2'-pyridyl-morpholinomethyl)-1,3,5-triazine having a melting point of 178–180° C.

Analytical values as $C_{17}H_{23}N_7O_2$ are as follows:
Calculated (percent): C, 57.12; H, 6.49; N, 27.44.
Found (percent): C, 57.12; H, 6.64; N, 27.56.

The obtained 2-amino-4-morpholino-6-(2'-pyridyl-morlinomethyl)-1,3,5-triazine was dissolved into ethanol. A calculated amount of N-sulfuric acid was added to the solution. The solvent was removed by distillation under reduced pressure. Recrystallization of the residue from ethanol gave a sulfate of 2-amino-4-morpholino-6-(2'-pyridyl-morpholinomethyl)-1,3,5-triazine having a decomposition point of 217–219° C.

EXAMPLES 2–44

In the same manner as in Example 1, the compounds of Formula II were prepared, and were reacted with the amines of Formula III. The reaction conditions and the obtained compounds of Formula I are shown in Tables II and III. The reaction temperature was the refluxing temperature of the solvent used or room temperature. Table IV shows the preparation of the compounds of Formula II given in Table II.

TABLE II

| Ex. No. | Reactants Compound of Formula II Name | Amount (g.) | Compound of Formula II Name | Amount (g.) | Solvent Name | Amount (ml.) | Reaction period (hrs.) | Reaction temperature |
|---|---|---|---|---|---|---|---|---|
| 2 | 2,4-diamino-6-(2'-pyridyl-bromomethyl)-1,3,5-triazine. | 2.5 | Morpholine | 1.7 | Ethanol | 70 | 6 | Reflux. |
| 3 | 2-amino-4-methylamino-6-(2'-pyridyl-bromomethyl)-1,3,5-triazine. | 1.2 | ...do... | 0.7 | ...do... | 30 | 5 | Do. |
| 4 | 2-amino-4-dimethylamino-6-(2'-pyridyl-bromomethyl)-1,3,5-triazine. | 2.0 | ...do... | 1.12 | ...do... | 30 | 5 | Do. |
| 5 | 2-amino-4-diallylamino-6-(2'-pyridyl-bromomethyl)-1,3,5-triazine. | 25.4 | ...do... | 12.2 | ...do... | 100 | 5 | Do. |
| 6 | 2-amino-4-(N-methylanilino)-6-(2'-pyridyl-bromomethyl)-1,3,5-triazine. | 6.5 | ...do... | 3.5 | ...do... | 120 | 5 | Do. |
| 7 | 2-amino-4-piperidino-6-(2'-pyridyl-bromomethyl)-1,3,5-triazine. | 5.0 | ...do... | 2.8 | ...do... | 50 | 5 | Do. |
| 8 | 2-amino-4-morpholino-6-(2'-pyridyl-bromomethyl)1,3,5-triazine. | 7.0 | Piperidine | 3.5 | Isopropanol. | 140 | 5 | Do. |
| 9 | 2-amino-4-morpholino-6-(2'-pyridyl-bromomethyl)-1,3,5-triazine. | 10.0 | Azacycloheptane | 6.2 | Ethanol | 100 | 5 | Do |
| 10 | 2-amino-4-morpholino-6-(2'-pyridyl-bromomethyl)-1,3,5-triazine. | 7.1 | N-(β-hydroxyethyl) piperazine. | 5.3 | ...do... | 80 | 15 | Do. |
| 11 | 2,4-diamino-6-(phenyl-bromomethyl)-1,3,5-triazine. | 5.0 | Piperidine | 3.1 | ...do... | 120 | 5 | Do. |
| 12 | 2,4-diamino-6-(phenyl-bromomethyl)-1.3.5-triazine. | 2.0 | Azacycloheptane | 1.4 | ...do... | 30 | 5 | Do. |
| 13 | 2,4-diamino-6-(phenyl-bromomethyl)-1.3.5-triazine. | 7.5 | Morpholine | 4.2 | ...do... | 200 | 6 | Do. |
| 14 | 2-amino-4-dimethylamino-6-(phenyl-bromomethyl)-1,3,5-triazine. | 1.5 | ...do... | 0.9 | ...do... | 20 | 5 | Do. |
| 15 | 2-amino-4-morpholino-6-(phenyl-bromomethyl)-1,3,5-triazine. | 3.3 | Pyrrolidine | 1.3 | ...do... | 30 | 5 | Do. |
| 16 | 2-amino-4-morpholino-6-(phenyl-bromomethyl)-1,3,5-triazine. | 2.5 | Piperidine | 1.3 | ...do... | 50 | 4 | Do. |
| 17 | 2-amino-4-morpholino-6-(phenyl-bromomethyl)-1,3,5-triazine. | 2.7 | Azacycloheptane | 1.68 | ...do... | 50 | 5 | Do. |
| 18 | 2-amino-4-morpholino-6-(phenyl-bromomethyl)-1,3,5-triazine. | 3.7 | Morpholine | 1.9 | ...do... | 50 | 5 | Do. |
| 19 | 2,4-diamino-6-(phenyl-bromomethyl)-1,3,5-triazine. | 1.0 | Azacyclooctane | 0.89 | Methanol | 30 | 10 | Room temperature. |

TABLE III

| Ex. No. | Compound I $R_1$-$N(R_2)$- | $R_3$-$N(R_4)$- | $R_5$ | $-N(R_6)R_7$ | Melting point | Molecular formula | Calculated C | Calculated H | Calculated N | Found C | Found H | Found N | Acid salt decomposition temperature | Yield, percent |
|---|---|---|---|---|---|---|---|---|---|---|---|---|---|---|
| 2 | $-NH_2$ | $-NH_2$ | pyridyl | morpholino | 270 (dec.) (ethanol) | $C_{13}H_{17}N_7O$ | [1] 62.69 | [1] 6.12 [1] 33.09 | [1] 53.30 | [1] 6.25 [1] 33.16 | | | $H_2SO_4$ 167-170 (methanol) | 59 |
| 3 | $-NH_2$ | $-NHCH_3$ | Same | do | 178-182 (ethylacetate) | $C_{14}H_{19}N_7O$ | 55.80 | 6.36 | 32.54 | 55.68 | 6.74 | 32.87 | $H_2SO_4$ 218-219 (methanol) | [2] 48.5 |
| 4 | $-NH_2$ | $-N(CH_3)CH_3$ | do | do | 213-215 (dec.) (ethanol) | $C_{15}H_{21}N_7O$ | 57.12 | 6.71 | 31.09 | 57.11 | 7.00 | 31.08 | | 24.5 |
| 5 | $-NH_2$ | $-N(CH_2CH=CH_2)CH_2CH=CH_2$ | do | do | 122-123 (benzene) | $C_{19}H_{25}N_7O$ | 62.10 | 6.89 | 26.69 | 62.23 | 7.12 | 26.78 | | 18.5 |
| 6 | $-NH_2$ | $-N(CH_3)$benzyl | do | do | 214-216 (dec.) (ethanol) | $C_{20}H_{23}N_7O$ | 63.64 | 6.14 | 25.98 | 63.21 | 6.50 | 25.78 | | 39 |
| 7 | $-NH_2$ | piperidino | do | do | 220-223 (methanol) | $C_{18}H_{25}N_7O$ | 60.82 | 7.09 | 27.59 | 60.72 | 7.65 | 27.43 | | 68.5 |
| 8 | $-NH_2$ | morpholino | do | do | 129-131 (ethanol) | $C_{18}H_{23}N_7O \cdot H_2O$ | 57.92 | 7.28 | 26.27 | 57.56 | 7.42 | 26.08 | $H_2SO_4$ 157-159 (methanol) | 73.5 |
| 9 | $-NH_2$ | Same as above | do | do | 155-157 (dec.)[3] | $C_{19}H_{27}N_7O$ | 61.76 | 7.37 | 26.54 | 62.16 | 7.93 | 26.50 | $H_2SO_4$ 170-172 (ethanol) | 38.5 |
| 10 | $-NH_2$ | do | do | $N$-$CH_2CH_2OH$ | 155-157 (ethanol) | $C_{19}H_{28}N_8O_2$ | 56.98 | 7.05 | 27.98 | 56.51 | 7.44 | 27.53 | | 25.8 |
| 11 | $-NH_2$ | $-NH_2$ | phenyl | piperidino | 238-240 (ethanol) | $C_{15}H_{20}N_6$ | 63.35 | 7.09 | 27.56 | 63.33 | 7.60 | 29.42 | $H_2SO_4$ 268 (methanol) | 61.5 |
| 12 | $-NH_2$ | $-NH_2$ | Same | piperidino | 198-201 (ethanol) | $C_{16}H_{22}N_6$ | 64.40 | 7.43 | 28.17 | 64.40 | 7.19 | 28.36 | $H_2SO_4$ 190 (ethanol) | 66.0 |
| 13 | $-NH_2$ | $-NH_2$ | do | morpholino | 236 (ethanol) | $C_{14}H_{18}N_6O$ | 58.72 | 6.34 | 29.35 | 58.86 | 6.29 | 29.17 | HBr 200 (methanol) | 58.5 |

See footnotes at end of table.

The following compounds were obtained in the similar manner.

| Ex. No. | | M.P. |
|---|---|---|
| 20 | 2-amino-4-methylamino-6-[2'-pyridyl-4''-phenyl-piperazyl-(1'')-methyl]-1,3,5-triazine. | 99–100 |
| 21 | 2-amino-4-ethylamino-6-(2'-pyridyl-morpholino-methyl)-1,3,5-triazine. | 155–156 |
| 22 | 2-amino-4-diethylamino-6-(2'-pyridyl-morpholino-methyl)-1,3,5-triazine. | 127–128 |
| 23 | 2-amino-4-allylamino-6-(2'-pyridyl-morpholino-methyl)-1,3,5-triazine. | ¹ 187–188 |
| 23 | 2-amino-4-cyclohexylamino-6-(2'-pyridyl-morpholinomethyl)-1,3,5-triazine. | ¹ 267–269 |
| 25 | 2-amino-4-benzylamino-6-(2'-pyridyl-morpholino-methyl)-1,3,5-triazine. | 206–207 |
| 26 | 2-amino-4-pyrrolidino-6-(2'-pyridyl-morpholino-methyl)-1,3,5-triazine. | 234–236 |
| 27 | 2-amino-4-(N-azacycloheptyl)-6-(2'-pyridyl-morpholino-methyl)-1,3,5-triazine. | 150–151 |
| 28 | 2,4-diamino-6-[phenyl-3'-azabicyclo(3,2,2)nonano-methyl]-1,3,5-triazine. | 226–229 |
| 29 | 2,4-diamino-6-(p-sulfamoylphenyl-N-azacyclo-heptyl-methyl)-1,3,5-triazine. | 166–169 |
| 30 | 2,4-diamino-6-(p-sulfamoylphenyl-morpholino-methyl)-1,3,5-triazine. | ¹ 207–212 |
| 31 | 2,4-diamino-6-(m-sulfamoylphenyl-N-azacyclo-heptylmethyl)-1,3,5-triazine. | Amorphous |
| 32 | 2,4-diamino-6-(p-chlorophenyl-N-azacycloheptyl-methyl)-1,3,5-triazine. | 179–181 |
| 33 | 2,4-diamino-6-(p-chlorophenyl-morpholinomethyl)-1,3,5-triazine. | 156–159 |
| 34 | 2,4-diamino-6-(m-chlorophenyl-N-azacycloheptyl-methyl-1,3,5-triazine. | 209.5–211.5 |
| 35 | 2,4-dimonomethylamino-6-(2'-pyridyl-morpho-linomethyl)-1,3,5-triazine. | 162–163 |
| 36 | 2-dimethylamino-4-methylamino-6-(2'-pyridyl-morpholinomethyl)-1,3,5-triazine. | 137–138 |
| 37 | 2-hydrozino-4-methylamino-6-(2'-pyridyl-morpho-linomethyl)-1,3,5-triazine. | 175–177 |
| 38 | 2-azido-4-methylamino-6-(2'-pyridyl-morpholino-methyl)-1,3,5-triazine. | ¹ 143–145 |
| 39 | 2-morpholino-4-dimethylamino-6-(2'-pyridyl-morpholinomethyl)-1,3,5-triazine. | 106–108 |
| 40 | 2-methoxy-4-dimethylamino-6-(2'-pyridyl-morpho-linomethyl)-1,3,5-triazine. | 110–112 |
| 41 | 2-azido-4-amino-6-(phenyl-N-azacycloheptyl-methyl)-1,3,5-triazine. | 124–126 |
| 42 | 2-amino-4-dimethylamino-6-(3'-pyridyl-morpho-lino-methyl)-1,3,5-triazine. | 208–209 |
| 43 | 2-amino-4-morpholino-6-(3'-pyridyl-morpholino-methyl)-1,3,5-triazine. | 166–167 |
| 44 | 2-amino-4-dimethylamino-6-(4'-pyridyl-morpho-lino-methyl)-1,3,5-triazine. | 186–188 |

¹ Decomposition.

EXAMPLE 45

Preparation of the compound of Formula II (1) N'-methylbiguanide hydrochloride (15.0 g.) was added to a sodium methylate solution prepared from 3.67 g. of sodium and 140 ml. of anhydrous methanol. On addition of 19.5 g. of ethyl 2-pyridyl-bromoacetate, the mixture was treated in the same manner as in Example 1. Recrystallization from ethanol gave 5.2 g. (21.7% yield) of 2-amino-4-methylamino-6(2'-pyridyl-bromomethyl)-1, 3,5-triazine having a melting point of 164–165° C. (decomposition).

The analytical values as $C_{10}H_{11}N_6Br$ are as follows:
Calculated (percent): C, 40.69; H, 3.76; N, 28.48.
Found (percent): C, 41.03; H, 4.20; N, 28.65.

(2) N'-methylbiguanide dihydrochloride (3.76 g.) was suspended in 5 ml. of methanol, and 11.5 ml. of 10% sodium methylene solution and 3.33 g. of methyl 2-pyridyl acetate were added to the suspension. The mixture was treated in the same manner as in Example 1. Recrystallization from methanol gave 0.88 g. (20.3% yield) of 2-amino-4-methylamino-6-(2'-pyridylmethyl) - 1,3,5 - triazine.

The analytical values as $C_{10}H_{12}N_6$ are as follows:
Calculated (percent): C, 55.54; H, 5.59; N, 38.87.
Found (percent): C, 55.58; H, 6.05; N, 39.04.

The above obtained 2-amino-4-methylamino-6-(2'-pyridylmethyl)-1,3,5-triazine was brominated in the same manner as in Example 1. The precipitated crystals were recrystallized from ethanol to obtain 2-amino-4-methyl-amino-6-(2'-pyridyl-bromomethyl)-1,3,5 - triazine having a melting point of 164–165° C. (decomposition).

The analytical values as $C_{10}H_{11}N_6Br$ are as follows:
Calculated (percent): C, 40.69; H, 3.76; N, 28.48.
Found (percent): C, 41.05; H, 4.28; N, 28.60.

TABLE III—Continued

| Ex. No. | Compound I (R₁R₂N–, R₃R₄N–, R₅R₆N–/R₇) | Melting point | Molecular formula | Calculated C | Calculated H | Calculated N | Found C | Found H | Found N | Acid salt decomposition temperature | Yield, percent |
|---|---|---|---|---|---|---|---|---|---|---|---|
| 14 | –NH₂ / –N(CH₃)₂ / Same as above | 202–203 (ethanol) | $C_{10}H_{22}N_6O$ | 61.12 | 7.05 | 26.73 | 61.38 | 7.40 | 26.39 | $H_2SO_4$ 180–184 (ethanol) | 25.0 |
| 15 | –NH₂ / –N(CH₃) morpholino | Oily substance | $C_{18}H_{24}N_6O$ ⁴ | ⁴ 48.31 | ⁴ 6.08 | ⁴ 18.42 | ⁴ 48.34 | ⁴ 6.64 | ⁴ 18.64 | $H_2SO_4$ 243 (dil ethanol) | ² 57.5 |
| 16 | –NH₂ / morpholino / Same as above | 142–146 (ethanol) | $C_{19}H_{28}N_6O$ | 64.38 | 7.39 | 23.71 | 64.23 | 7.96 | 23.91 | $H_2SO_4$ 268–270 (dil ethanol) | 39.6 |
| 17 | –NH₂ / piperidino | 147–152 (ethanol) | $C_{20}H_{28}N_6O$ | 65.19 | 7.66 | 22.81 | 65.07 | 8.18 | 23.07 | $H_2SO_4$ 216–220 (ethanol) | 53.0 |
| 18 | –NH₂ / pyrrolidino | 196–199 (ethanol) | $C_{18}H_{24}N_6O_2$ | 60.65 | 6.79 | 23.58 | 60.09 | 7.11 | 23.17 | $H_2SO_4$ 244–246 (ethanol) | 90 |
| 19 | –NH₂ / azacycloheptyl | 222–225 (dil ethanol) | $C_{17}H_{24}N_6$ | 65.35 | 7.74 | 26.90 | 65.14 | 8.34 | 26.71 | | 74 |

¹ $C_{18}H_{17}N_7O\cdot\frac{1}{2}H_2O$. ² As sulfate. ³ Ethanol petroleum ether. ⁴ $C_{18}H_{24}N_6O\cdot H_2SO_4\cdot\frac{1}{2}H_2O$.

TABLE IV

| Ex. No. | Compounds of Formula V | | Reactants Compounds of Formula IV | | Solvent | | Amount (ml.) | Reaction temperature | Reaction period (hrs.) | Base used— Name | M.P. of compounds of Formula II | Yield, percent |
|---|---|---|---|---|---|---|---|---|---|---|---|---|
| | Name | Amount (g.) | Name | Amount (g.) | Name | | | | | | | |
| 2 | Ethyl-2-pyridylbromoacetate | 14.6 | Biguanide·HCl | 14.6 | Methanol | | 50 | Room temperature | 72 | Sodium methylate | *132–133 | 37.8 |
| 3 | do | 19.5 | N¹-methyl-biguanide·HCl | 19.5 | do | | 140 | do | 72 | do | *164–165 | 21.7 |
| 4 | do | 14.1 | N¹,N¹-dimethyl-biguanide·HCl | 14.1 | Ethanol | | 60 | do | 72 | Sodium ethylate | 129–130 | 75 |
| 5 | do | 24.0 | N¹,N¹-diallyl-biguanide·HCl | 24.0 | Methanol | | 60 | do | 72 | Sodium methylate | Oil | |
| 6 | do | 8.1 | N¹-methyl-N¹-phenyl-biguanide·HCl | 8.1 | do | | 60 | do | 96 | do | Oil | |
| 7 | do | 9.6 | N¹-methyl-N¹-penta-methylene-biguanide·HCl | 9.6 | do | | 20 | do | 72 | do | *131–133 | 34.8 |
| 8 | do | 49.8 | N¹,N¹-anhydro-bis-(β-hydroxyethyl)-biguanide·HCl | 49.8 | do | | 15 | do | 72 | do | 155–156 | 21 |
| 9 | do | 5.3 | do | 5.3 | do | | 15 | do | 72 | do | 155–156 | 21 |
| 10 | do | 5.3 | do | 5.3 | do | | 15 | do | 72 | do | 155–156 | 21 |
| 11 | Ethyl-phenylbromoacetate | | do | | do | | | do | | do | | |
| 12 | do | | do | | do | | | do | | do | | |
| 13 | do | | do | | Biguanide·HCl | | | do | | do | | |
| 14 | do | 20.0 | do | | Methanol | | 70 | do | 72 | do | 146–148.5 | 25 |
| 15 | do | 29.6 | N¹,N¹-dimethyl-biguanide·HCl | 29.6 | do | | 50 | do | 72 | do | 165–168 | 30 |
| 16 | do | 11.8 | N¹,N¹-anhydro-bis-(β-hydroxyethyl)-biguanide·HCl | 11.8 | do | | 50 | do | 72 | do | 165–168 | 30 |
| 17 | do | 11.8 | do | 11.8 | do | | 50 | do | 72 | do | 165–168 | 30 |
| 18 | do | 11.8 | do | 11.8 | do | | 50 | do | 72 | do | 165–168 | 30 |
| 19 | do | 12.6 | Biguanide·HCl | 12.6 | do | | 40 | do | 24 | do | *179–181 | 63 |

*Decomposition.

Preparation of the compound of Formula I

To 30 ml. of ethanol were added 1.2 g. of 2-amino-4-methylamino-6-(2'-pyridyl-bromomethyl)-1,3,5 - triazine and 0.7 g. of morpholine, and the mixture was heated for 5 hours under reflux. The treatment was effected in the same manner as in Example 1. Subsequent recrystallization from ethyl acetate gave 0.6 g. (48.5% yield) of crystals having a melting point of 178–182° C. The obtained product was converted into its sulfate by a customary method, and recrystallized from ethanol. There was obtained 2-amino-4-methylamino-6-(2'-pyridyl-morpholinomethyl) - 1,3,5-triazine sulfate having a decomposition point of 218–219° C.

The analytical values as $C_{14}H_{19}N_7O \cdot H_2SO_4$ are as follows:

Calculated (percent): C, 42.09; H, 5.55; N, 24.55.
Found (percent): C, 41.90; H, 5.44; N, 24.54.

Compound I is advantageously administered orally, e.g. in the form of tablets or the like, in a dosage range of about 100 to 200 milligrams per day to a human patient suffering e.g. from high blood pressure of edema. The Compound I can also be administered by injection.

We claim:
1. A compound of the formula:

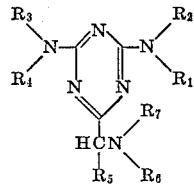

wherein $R_1$ and $R_2$ represent lower alkyl of 1 to 6 carbon atoms or H, $R_3$ and $R_4$ are selected from the group consisting of H, lower alkyl of 1 to 6 carbon atoms, allyl, benzyl, phenyl and cyclohexyl, and $R_3$ and $R_4$ when taken together with N represent a radical selected from the group consisting of piperidino, morpholino, pyrrolidino and

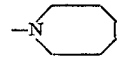

$R_5$ represents a radical selected from the group consisting of phenyl, p-chlorophenyl, p-sulfamoylphenyl and 2, 3 or 4-pyridyl and $R_6$ and $R_7$ are taken together with N and represent a radical selected from the group consisting of N-morpholino, N-piperidino

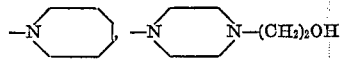

and N-pyrrolidino.

2. The triazine derivative according to claim 1 wherein the triazine derivative expressed by the Formula I is 2 - amino - 4 - morpholino-6-(2'-pyridyl-morpholinomethyl)-1,3,5-triazine.

3. The triazine derivative according to claim 1 wherein the triazine derivative expressed by the Formula I is 2,4 - diamino - 6-(2'-pyridyl-morpholinomethyl)-1,3,5-triazine.

4. The triazine derivative according to claim 1 wherein the triazine derivative expressed by the Formula I is 2 - amino - 4-methylamino-6-(2'-pyridyl-morpholinomethyl)-1,3,5-triazine.

5. The triazine derivative according to claim 1 wherein the triazine derivative expressed by the Formula I is 2 - amino - 4 - dimethylamino-6-(2'-pyridyl-morpholinomethyl)-1,3,5-triazine.

6. The triazine derivative according to claim 1 wherein the triazine derivative expressed by the Formula I is 2-amino-4-diallylamino-6-(2'-pyridyl-morpholinomethyl)-1,3,5-triazine.

7. The triazine derivative according to claim 1 wherein the triazine derivative expressed by the Formula I is 2-amino-4-(N-methylanilino)-6-(2'-pyridyl - morpholinomethyl)-1,3,5-triazine.

8. The triazine derivative according to claim 1 wherein the triazine derivative expressed by the Formula I is 2-amino-4-piperidino-6-(2'-pyridyl - morpholinomethyl)-1,3,5-triazine.

9. The triazine derivative according to claim 1 wherein the triazine derivative expressed by the Formula I is 2-amino-4-morpholino-6-(2'-pyridyl - piperidinomethyl)-1,3,5-triazine.

10. The triazine derivative according to claim 1 wherein the triazine derivative expressed by the Formula I is 2-amino - 4 - morpholino-6-(2'-pyridyl-N-azacycloheptylmethyl)-1,3,5-triazine.

11. The triazine derivative according to claim 1 wherein the triazine derivative expressed by the Formula I is 2-amino - 4 - morpholino-6-[2'-pyridyl-4''-($\beta$-hydroxyethyl)-piperazyl-(1'')-methyl]-1,3,5-triazine.

12. The triazine derivative according to claim 1 wherein the triazine derivative expressed by the Formula I is 2,4-diamino - 6-(phenyl-piperidinomethyl)-1,3,5-triazine.

13. The triazine derivative according to claim 1 wherein the triazine derivative expressed by the Formula I is 2,4-diamino - 6 - (phenyl-N-azacycloheptyl-methyl)-1,3,5-triazine.

14. The triazine derivative according to claim 1 wherein the triazine derivative expressed by the Formula I is 2,4-diamino - 6 - (phenyl-morpholinomethyl)-1,3,5-triazine.

15. The triazine derivative according to claim 1 wherein the triazine derivative expressed by the Formula I is 2-amino - 4 - dimethylamino-6-(phenyl-morpholinomethyl)-1,3,5-triazine.

16. The triazine derivative according to claim 1 wherein the triazine derivative expressed by the Formula I is 2 - amino - 4 - morpholino-6-(phenyl-pyrrolidinomethyl)-1,3,5-triazine.

17. The triazine derivative according to claim 1 wherein the triazine derivative expressed by the Formula I is 2-amino - 4 - morpholino-6-(phenyl - piperidinomethyl)-1,3,5-triazine.

18. The triazine derivative according to claim 1 wherein the triazine derivative expressed by the Formula I is 2-amino-4-morpholino - 6 - (phenyl-N-azacycloheptylmethyl)-1,3,5-triazine.

19. The triazine derivative according to claim 1 wherein the triazine derivative expressed by the Formula I is 2-amino - 4 - morpholino-6-(phenyl - morpholinomethyl)-1,3-5-triazine.

20. The triazine derivative according to claim 1 wherein the triazine derivative expressed by the Forfmula I is 2,4-diamino - 6 - (phenyl-N-azacyclooctylmethyl)-1,3,5-triazine.

21. The triazine derivative according to claim 1 wherein the triazine derivative expressed by the Formula I is 2-amino - 4 - methylamino-6-[2'-pyridyl-4''-phenylpiperazyl-(1'')-methyl]-1,3,5-triazine.

22. The triazine derivative according to claim 1 wherein the triazine derivative expressed by the Formula I is 2-amino - 4 - ethylamino-6-(2'-pyridyl-morpholinomethyl)-1,3,5-triazine.

23. The triazine derivative according to claim 1 wherein the triazine derivative expressed by the Formula I is 2-amino - 4 - benzylamino-6-(2'-pyridyl-morpholinomethyl)-1,3,5-triazine.

24. The triazine derivative according to claim 1 wherein the triazine derivative expressed by the Formula I is 2-amino - 4 - allylamino-6-(2'-pyridyl-morpholinomethyl)-1,3,5-triazine.

25. The triazine derivative according to claim 1 wherein the triazine derivative expressed by the Formula I is 2-amino - 4 - cyclohexylamino-6-(2'-pyridyl-morpholinomethyl)-1,3,5-triazine.

26. The triazine derivative according to claim 1 wherein the triazine derivative expressed by the Formula I is 2-amino - 4 - diethylamino-6-(2' - pyridyl-morpholinomethyl)-1,3,5-triazine.

27. The triazine derivative according to claim 1 wherein the triazine derivative expressed by the Formula I is 2-amino - 4 - pyrrolidino-6-(2'-pyridyl-morpholinomethyl)-1,3,5-triazine.

28. The triazine derivative according to claim 1 wherein the triazine derivative expressed by the Formula I is 2-amino - 4 - (N-azacycloheptyl)-6-(2'-pyridyl-morpholinomethyl)-1,3,5-triazine.

29. The triazine derivative according to claim 1 wherein the triazine derivative expressed by the Formula I is 2,4 - diamino - 6 - [phenyl - 3' - azacyclo(3,2,2)nonanomethyl]-1,3,5-triazine.

30. The triazine derivative according to claim 1 wherein the triazine derivative expressed by the Formula I is 2,4-diamino - 6 - (p-sulfamoylphenyl-N-azacycloheptylmethyl)-1,3,5-triazine.

31. The triazine derivative according to claim 1 wherein the triazine derivative expressed by the Formula I is 2,4-diamino - 6 - (p-sulfamoylphenyl-morpholinomethyl)-1,3,5-triazine.

32. The triazine derivative according to claim 1 wherein the triazine derivative expressed by the Formula I is 2,4-diamino - 6 - (m-sulfamoylphenyl-N-azacycloheptylmethyl)-1,3,5-triazine.

33. The triazine derivative according to claim 1 wherein the triazine derivative expressed by the Formula I is 2,4-diamino - 6 - (p-chlorophenyl-N-azacycloheptylmethyl)-1,3,5-triazine.

34. The triazine derivative according to claim 1 wherein the triazine derivative expressed by the Formula I is 2,4-diamino - 6 - (p-chlorophenyl-morpholinomethyl)-1,3,5-triazine.

35. The triazine derivative according to claim 1 wherein the triazine derivative expressed by the Formula I is 2,4 - diamino - 6 - (m-chlorophenyl-N-azacycloheptylmethyl)-1,3,5-triazine.

36. The triazine derivative according to claim 1 wherein the triazine derivative expressed by the Formula I is 2,4-dimethylamino - 6 - (2'-pyridyl-morpholinomethyl)-1,3,5-triazine.

37. The triazine derivative according to claim 1 wherein the triazine derivative expressed by the Formula I is 2-dimethylamino-4-methylamino - 6 - (2' - pyridyl-morpholinomethyl)-1,3,5-triazine.

38. The triazine derivative according to claim 1 wherein the triazine derivative expressed by the Formula I is 2-amino-4-dimethylamino - 6 - (3'-pyridyl-morpholinomethyl)-1,3,5-triazine.

39. The triazine derivative according to claim 1 wherein the triazine derivative expressed by the Formula I is 2-amino-4-morpholino - 6 - (3'-pyridyl-morpholinomethyl)-1,3,5-triazine.

40. The triazine derivative according to claim 1 wherein the triazine derivative expressed by the Formula I is 2-amino-4-dimethylamino - 6 - (4'-pyridyl-morpholinomethyl)-1,3,5-triazine.

No references cited.

ALEX MAZEL, Primary Examiner

J. TOVAR, Assistant Examiner

U.S. Cl. X.R.

260—247.1, 247.5 R, 249.9; 424—248